United States Patent Office 3,051,932
Patented Aug. 28, 1962

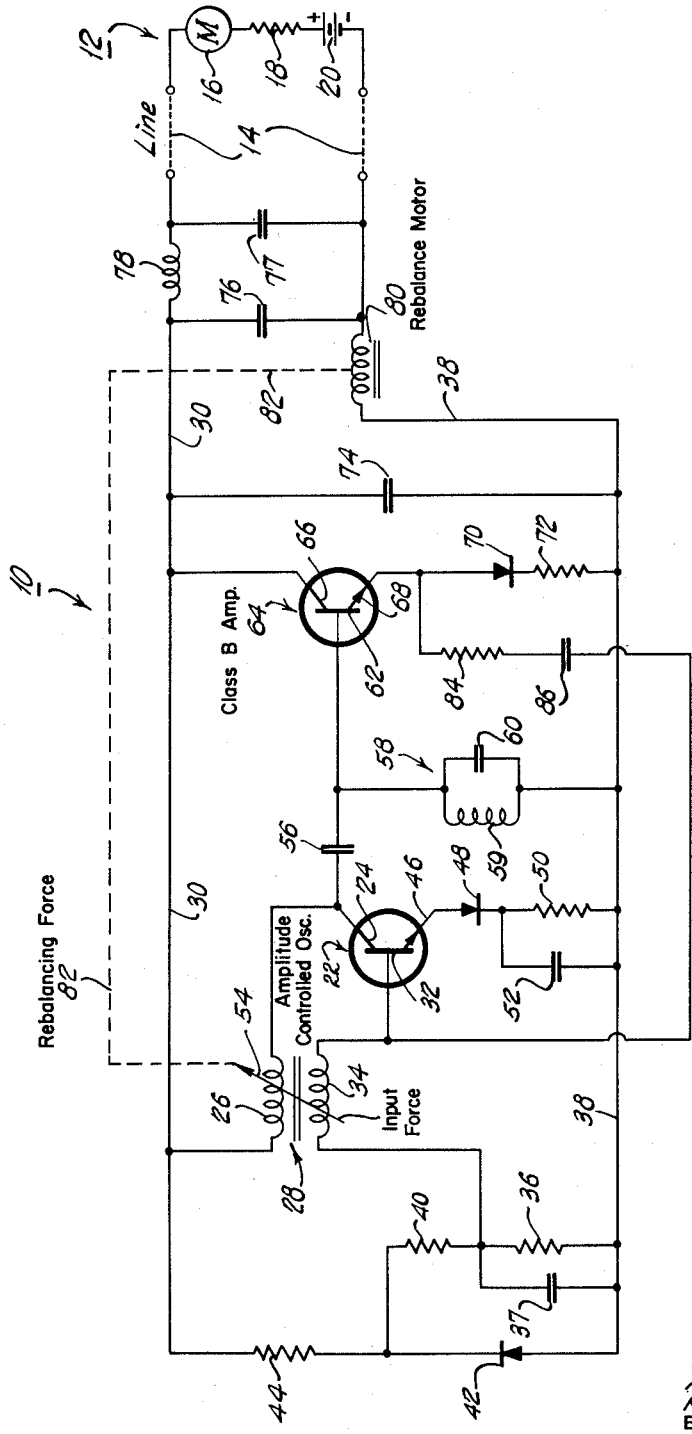

3,051,932
ELECTRICALLY OPERATED APPARATUS FOR REMOTE MEASURING
John R. Cressey, Dedham, Neal D. Peterson, North Easton, Alfred Nazareth, Jr., Rehoboth, and Richard P. Lawler, Foxboro, Mass., assignors to The Foxboro Company, Foxboro, Mass.
Filed Sept. 12, 1958, Ser. No. 760,718
6 Claims. (Cl. 340—187)

This invention relates to an improved arrangement for sending from a remote location to a central station an electrical signal proportional to a physical condition, such as pressure, temperature, or the like, being measured at the remote location.

An object of this invention is to provide a simple and very efficient apparatus for converting the measurement of a physical condition into a very accurately corresponding electrical signal and for then transmitting the signal to a distant point where it can be used to operate a device such as an indicator or process controller.

Another object is to provide such apparatus which is relatively inexpensive and which is very accurate, stable, and reliable in operation.

A more specific object is to provide remote measuring and signalling apparatus of this kind which can operate indefinitely without maintenance or service and which can be supplied with power from a central station over a single pair of wires which also serve to transmit a measurement signal back to the central station.

These and other objects will in part be understood from and in part pointed out in the description given hereinafter.

In certain industrial applications where physical quantities such as force, temperature, rate of flow, etc., are measured and controlled it frequently is necessary to have the actual measuring device positioned a considerable distance, perhaps as much as several miles, from an instrument or meter at a central station where the measurement can conveniently be indicated or recorded. For many years it had been the practice to convert a measured quantity at a remote location into an air pressure signal the value of which was directly proportional to the quantity. This pressure signal was then transmitted to the central station via an air line to a pneumatically-operated recording instrument or the like.

Recently, because of the need for higher speed, more compact and rugged equipment, electrically-operated instruments have been used in place of pneumatic devices. Now instead of an air tube, an electric transmission line is used to interconnect the remote metering device with a centrally located meter. However, a drawback with many of these systems up to now is that the most practical electrical transducers for converting the measurement of a physical quantity into an electric signal are able to produce only very small current or voltage outputs. This in turn necessitates amplifying of the signal at the remote location to a level large enough for transmission to a distant central station. Where vacuum tubes having heated filaments are used to amplify the signal at the remote station (as shown for example in U.S. Patent Re. 24,267), the connecting line to the central station not only has to have a pair of wires for transmitting the measurement signal, but also one or more wires for supplying electrical power to the vacuum tubes.

Transistors, of course, do not require a separate source of filament power, and therefore it is obviously advantageous to substitute them for vacuum tubes in these remote measuring systems in order to reduce the number of interconnecting wires. However, the power handling capacity of presently available transistors is relatively low and they are very sensitive to changes in temperature. Accordingly, their use in remote measuring circuits requiring a high degree of accuracy and reliability has been very limited. The present invention provides a practical solution to these problems.

In accordance with the present invention, in a specific embodiment thereof to be described hereinbelow, there is provided a two transistor signalling circuit which is arranged to sense a physical condition, namely, the amount of force exerted on a transducer element, and to convert the measurement of this condition to a direct current the magnitude of which is linearly and accurately proportional to the force. The internal impedance of this circuit is such that the signal current can be transmitted along a line over a wide range of distances without causing instability or variation in the current because of the length of the line. The far end of the line extends to a central station and is terminated with an indicating or recording meter in series with a source of D.-C. current which is the sole power supply for the entire system. The signal current flowing in the line also drives a torque motor physically included as part of the signalling circuit. This motor operates to apply a rebalancing force to the transducer element, which may for example be an iron vane in a magnetic field so that the transducer element moves only minute distances throughout the entire range of force measurement. This results in the output of the circuit being substantially linearly related to force without errors due to changes in position of the transducer element.

The first of the two transistors in this signal circuit is arranged as an unsaturated oscillator, the amount of positive feedback applied to it being variable in accordance with the force exerted on the transducer element. The use of an amplifying element connected to oscillate under variable feedback conditions in this general way is well known (see for example the above-mentioned U.S. patent), but here, instead of directly monitoring the current through the oscillator, alternating current from it is fed to a resonant tank and used to drive a second transistor connected as a class B amplifier. This results in greater overall efficiency and gain and minimizes instability, such as "hunting" of the rebalancing motor. A certain amount of negative feedback is applied from the second to the first transistor to make the output current fully linear with respect to force, and the circuit is temperature compensated so that the signal remains linear over a wide working range of temperature.

A better understanding of the invention together with a fuller appreciation of its many advantages will best be gained from the following description given in connection with the accompanying drawing which shows a circuit arrangement embodying features of the invention.

This arrangement includes two parts, the one on the left as seen in the drawing comprising a signalling circuit generally indicated at 10, and the one at the right comprising a metering and recording circuit 12. Signalling circuit 10 can be far removed (for example, several miles) from the metering and recording circuit, these circuit parts being connected together by a two-wire line 14.

Recording circuit 12 includes a meter 16, which may, for example, be a chart recorder of known construction, having its internal impedance represented by a series resistor 18. Connected in series with the meter is a D.C. source 20 which supplies the current flowing serially through the meter, line 14 and signalling circuit 10. The magnitude of this current is accurately controlled by circuit 10, as will be explained to produce an indication on meter 16 proportional to a physical value (force) being measured. Source 20, via line 14, supplies the only power required for the operation of circuit 10.

Circuit 10 includes a first transistor 22 which functions as a variable oscillator. To this end, the collector 24 of the transistor is connected through the primary winding 26 of a variable, positive-feedback transformer 28 to a lead 30 which is joined to the upper wire of line 14. The base 32 of transistor 22 is connected to one side of the secondary winding 34 of transformer 28, the other side of this winding being connected through a resistor 36 to a lead 38 which, in turn, is joined to the lower wire of line 14. Resistor 36 which is shunted by a large filter capacitor 37, is connected in series with a resistor 40 and the two are connected in parallel with a Zener diode 42, these elements in turn being connected through a dropping resistor 44 to lead 30. Since the voltage across diode 42 remains constant in spite of variations in the voltage difference between leads 30 and 38, a constant bias current is applied to base 30 of transistor 22. The emitter 46 of transistor 22 is connected through a blocking diode 48 and a temperature compensating load resistor 50 to lead 38. Resistor 50 is shunted by a capacitor 52 so that the A.C. impedance is low. Diode 48 prevents harmful reverse current through transistor 22 in the event that the oscillations in it become excessive.

Transformer 28 can be of known construction such that the coupling between its primary and secondary is mechanically variable in accordance with the position of a movable element schematically illustrated by arrow 54. Thus, when element 54 is acted upon by a force in the proper direction, the coupling between primary and secondary will be increased. This will cause an increase in the positive feedback provided by the transformer which, in turn, results in a proportionally larger oscillating current in transistor 22.

The high-frequency oscillating voltage developed between collector 24 of transistor 22 and lead 38 is applied via a coupling capacitor 56 to a resonant tank 58 comprising a low-resistance inductor 59 and a capacitor 60. The voltage developed across this tank circuit in turn drives the base 62 of a second transistor 64 which operates as a class B amplifier, the collector 66 of this transistor being connected directly to lead 30, and the emitter 68 being connected through a blocking diode 70 and a load resistor 72 to lead 38. The average collector current flowing through transistor 66 is proportional to the amplitude of voltage across tank 58. This current represents the major portion of the signal current flowing to circuit 12 through line 14, only a small part of the total current being contributed by transistor 22. To prevent alternating currents generated in circuit 10 from being sent out on line 14, leads 30 and 38 are shunted by a large capacitor 74. Additionally at the junction of these leads with line 14 there is inserted a low pass filter comprising the shunt capacitors 76 and 77 and a series inductor 78. This filter also serves to prevent stray alternating voltages which may be induced on line 14 from reaching transistors 22 and 64.

Connected in series with lead 38 between transistor 64 and line 14 is a rebalancing motor 80 controlled by the signal current. The armature of this motor is mechanically interconnected, as indicated by dotted line 82, with movable element 54 of transformer 28. When the signal current flowing in line 10 varies because of a change in the force acting on element 54, motor 80 acts in a direction to oppose this force change and to rebalance the element. This rebalancing type of operation is important in making the signal current linearly proportional to the force being measured. To further improve this linearity, a portion of the alternating output signal from transistor 64 is fed back in negative phase to the base of transistor 22. This is accomplished by a resistor 84 and a capacitor 86 connected in series between the emitter of transistor 64 and the base of transistor 22.

Because the coupling between transistors 22 and 64 is A.C. rather than D.C., the circuit is very stable and linear in operation even though the power gain is quite high. The Q of tank 58 by itself is high, but because of the loading by transistor 64, the effective Q is lowered and the bandwidth considerably increased. This substantially minimizes instability due to variations in phase of the voltage across the tank, which might otherwise be caused by slight changes in the frequency of oscillation of transistor 22 upon change in the positive feedback. Since the resistance of inductor 59 is very low and it is connected directly to base 62 of transistor 64, there is no need to provide temperature compensation for this transistor. There is effectively no tendency for motor 80 to "hunt" when operating to rebalance the transformer 28. The accuracy of the signal current applied to line 14 is very good (of the order of ¼% maximum error) and remains so over a wide range of temperature in spite of normal changes in the operating characteristics of the transistors over such a wide range. Substantial changes in the length of line 14 do not affect the accuracy of the signal current, and this current is large enough to easily drive a standard recording meter.

In an actual system corresponding to the one described herein and which has been built and tested, the following circuit elements and values proved very satisfactory. Transistor 22, type 2N498; diode 42, type 1N469; transistor 64, type 2N551; resistor 50, nickel wire 450 ohms resistance; capacitor 52, 10 microfarads (mf.); capacitor 56, 1 mf.; inductor 59, 0.25 henry, 10 ohms resistance; capacitor 60, 0.33 mf.; resistor 72, 100 ohms; resistor 84, 15,000 ohms; capacitor 86, 1 mf.; source 20, 85 volts; resistor 18, 600 ohms. The frequency of oscillation of transistor 22 was about 800 cycles per second. About 10% feedback was applied from transistor 64 to transistor 22. The signal current on line 14 varied over a range of 10 to 50 milliamperes, and operation of circuit 10 was accurate to less than ¼% error at temperatures up to 140° F.

The above description is intended in illustration and not in limitation of the invention. Various changes may occur to those skilled in the art and these can be made without departing from the spirit or scope of the invention.

We claim:

1. Apparatus of the character described comprising a first lead and a second lead, a first transistor, a variable transducer for sensing a physical quantity and connected to apply positive feedback from the collector of said transistor to its base to cause high frequency oscillations, in the unsaturated mode the collector of said first transistor being conductively connected to said second lead, voltage regulating means connected between said leads and to said base to apply a constant bias thereto, a temperature compensating resistor and a diode connected in series with the emitter of said first transistor and said first lead, a low resistance inductance and a capacitor comprising a tank resonant at the frequency of oscillations of said first transistor, a coupling capacitor connecting said tank to said first transistor, a second transistor, said inductor connecting the base of said second transistor to said first lead, a resistor and a diode connected in series with the emitter of said second transistor and said first lead, the collector of said second transistor being conductively connected to said second lead, a feedback resistor and a capacitor connected in series between the base of said first transistor and the emitter of said second transistor, high frequency filter means connected across said leads, and a positioning motor connected in series with one of said leads and acting in response to current flowing in said lead to rebalance said transducer.

2. Apparatus as in claim 1 in further combination with a meter and a D.-C. source in series, and means including a two wire line connecting said meter and battery to said first and second leads.

3. A highly accurate and stable remote measuring and indicating system comprising a first transistor amplifier having an input and an output, and including transducer means connected to apply a varying amount of positive feedback from said output to said input to cause high frequency oscillations varying in accordance with the value of a physical quantity being measured, a second transistor amplifier having an input and an output, coupling means including a resonant tank to apply an output signal from said first transistor amplifier to said second transistor amplifier, output means responsive to the average current flowing in said amplifiers to give a measure of said physical quantity, a pair of leads connecting said output means with said amplifiers, and a D.-C. source connected to said leads to energize said amplifiers.

4. The system as in claim 3 wherein said coupling means includes a coupling capacitor and a low resistance inductance and a capacitor connected as said resonant tank, said second transistor amplifier including a transistor connected to said inductor and biased to operate as a class B amplifier, said second transistor serving to load said tank and lower its Q.

5. A very stable and accurate measuring and signalling circuit comprising a pair of leads, a first transistor, the collector and emitter thereof being conductively connected between said leads, a variable transducer connected to said transistor to cause variable oscillations in an unsaturated mode, said transducer being variable in accordance with a physical quantity to be measured, a second transistor, means including a resonant tank connecting the base of said second transistor to said first transistor, the collector and emitter of said second transistor being conductively connected between said leads, battery means connected to said leads, meter means in series with said leads to measure the average current flowing through said transistors and thereby provide a measure of said physical quantity, and motor means connected in series with said leads to rebalance said transducer.

6. The circuit as in claim 5 wherein said first transistor is connected to one of said leads by a temperature compensating resistor and a blocking diode in series, and said second transistor is connected to one of said leads by a resistor and a blocking diode in series, and the base of said first transistor is connected to said leads by constant bias means including a Zener diode.

References Cited in the file of this patent

UNITED STATES PATENTS

| | | |
|---|---|---|
| 2,154,260 | Brandenburger | Apr. 11, 1939 |
| 2,234,184 | MacLaren | Mar. 11, 1941 |
| 2,441,035 | Rath | May 4, 1948 |
| 2,445,880 | Hataway et al. | July 27, 1948 |
| 2,511,752 | Tandler et al. | June 13, 1950 |
| 2,614,163 | Roper | Oct. 14, 1952 |
| 2,653,282 | Darling | Sept. 22, 1953 |
| 2,764,643 | Sulzer | Sept. 25, 1956 |
| 2,780,101 | Kinkel | Feb. 5, 1957 |
| 2,842,669 | Thomas | July 8, 1958 |
| 2,907,931 | Moore | Oct. 6, 1959 |

OTHER REFERENCES

Electronics publication, March 13, 1959; pgs. 136, 137, "Transistors Improve Telemeter Transmitter," by Donald Ehemark.